April 10, 1934. M. F. BOOTH Re. 19,136

COOLING UNIT FOR REFRIGERATING SYSTEMS

Original Filed July 17, 1929 2 Sheets-Sheet 1

INVENTOR.
Morris F. Booth.

BY

Stuart G. Barnes
ATTORNEY.

April 10, 1934. M. F. BOOTH Re. 19,136
COOLING UNIT FOR REFRIGERATING SYSTEMS
Original Filed July 17, 1929 2 Sheets-Sheet 2
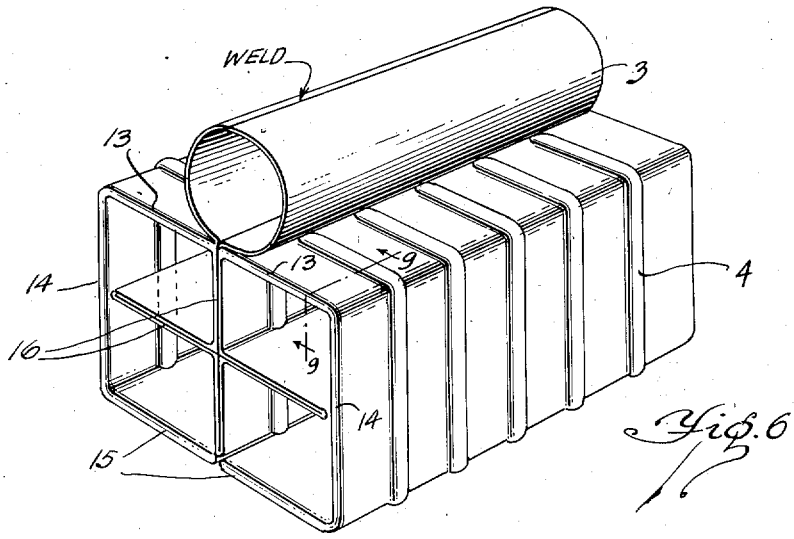
Fig. 6
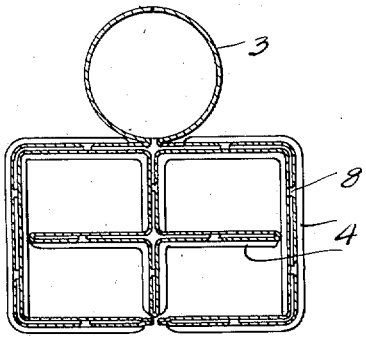
Fig. 7
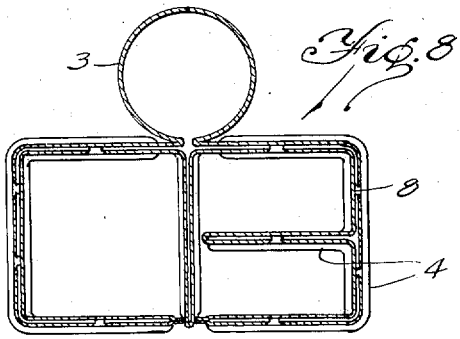
Fig. 8
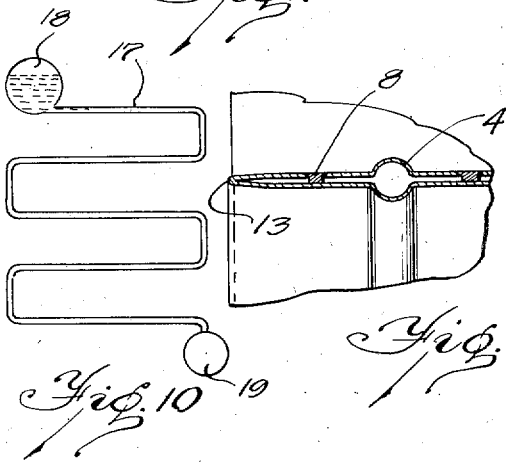
Fig. 9
Fig. 10
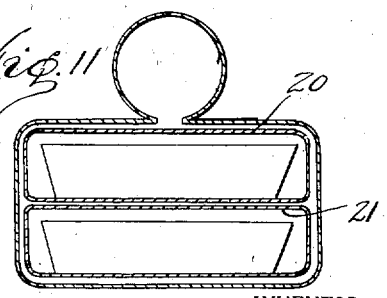
Fig. 11
INVENTOR.
Morris F. Booth.
BY
Stuart C. Barnes
ATTORNEY.

Reissued Apr. 10, 1934

Re. 19,136

UNITED STATES PATENT OFFICE 19,136

COOLING UNIT FOR REFRIGERATING SYSTEMS

Morris F. Booth, Chicago, Ill., assignor to Mullins Manufacturing Corporation, Salem, Ohio, a corporation of New York Original No. 1,893,321, dated January 3, 1933, Serial No. 378,843, July 17, 1929. Application for reissue November 4, 1933, Serial No. 696,732

18 Claims. (Cl. 62—126)

This invention relates to cooling units for refrigerating systems, and has to do particularly with an extremely efficient and simple cooling unit and novel method of fabricating the same.

The present invention is particularly adapted to refrigerating systems having low sides of the flooded type, and heretofore the fabrication of such lowsides has entailed considerable expense both because of the steps in the fabrication thereof and the material itself. This has been particularly true in the fabrication of lowsides having a float chamber or header and a plurality of depending copper tubes.

The object of the present invention is to provide a flooded type lowside having a header or float chamber and depending walls formed as an integral part of the header forming a thin passageway for the refrigerant, the walls and the passageway forming and defining a plurality of sharp freezing chambers surrounded on four or five sides by a thin layer of refrigerant.

A further feature of this invention resides in the method of fabricating a substantially complete lowside, having a float chamber and sharp freezing chambers, from a single sheet of thin metal. In this case, substantially the entire unit is formed from a single sheet of thin gage metal folded so as to form both a float chamber and the walls of the sharp freezing chambers.

A further feature of the present invention resides in the method of reinforcing and spacing the thin metal walls of the sharp freezing chambers whereby to form a relatively thin passageway for the refrigerant, and at the same time enable the unit to be made of very thin gage metal which will withstand a relatively large amount of pressure.

Other features reside in the general and various details of construction of the unit as a whole, and also in the arrangement of sharp freezing chambers as will be more clearly brought out in the specification and claims.

In the drawings:

Fig. 6 is a perspective view of a modified form of cooling unit fabricated to form a plurality of sharp freezing chambers.

Fig. 7 is a vertical sectional view of the structure shown in Fig. 6.

Fig. 8 illustrates a slightly modified method of arranging and fabricating the sheet metal so as to form one large and two small sharp freezing chambers.

Fig. 9 is a sectional view taken on line 9—9 of Fig. 6.

Fig. 10 is a diagrammatic illustration of a modified method of arranging the sheet metal so as to form continuous walls.

Fig. 11 is a front elevation illustrating a modified method of positioning two inner shells within an outer shell so as to form the continuous film of the refrigerant around all four sides and end of each sharp freezing chamber.

One of the most important features of the present invention resides in the fact that the cooling unit may be fabricated from a very thin gage sheet metal and this fact is made use of not only because it makes for a very cheap unit but because it makes possible the bending of the sheet metal stock so as to quickly and easily fabricate substantially the entire unit from a single piece of sheet metal.

Figure 1:
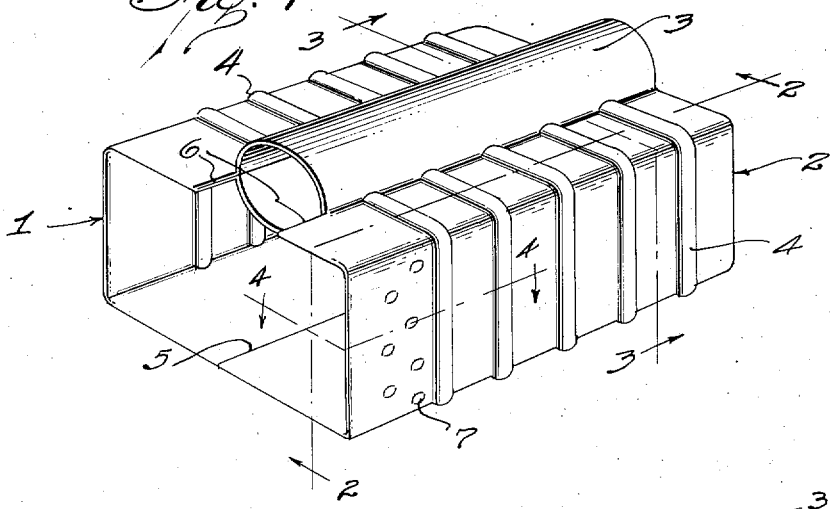
Fig. 1 is a perspective view of a simple flooded type cooling unit constructed in accordance with the present invention.

In fabricating a simple cooling unit such as that shown in Fig. 1, I preferably take a rectangular piece of sheet metal of approximately twice the length of the lowside and a width equal to the annular distance around the lowside including the half circumference of the float chamber. This sheet of metal is then folded upon itself so the line of fold is at the point indicated as at 1 and the two edges meet at the point 2. The float chamber is preferably formed integrally from the sheet metal, as indicated as at 3, and each half of the folded sheet may be deformed to provide the matched semi-cylindrical portions either before or after the sheet is folded upon itself.

The sheet metal going to form the unit is preferably provided with a series of corrugations or ridges 4 which extend laterally from the float chamber, and the purpose of these corrugations is not only to reinforce the entire unit but to provide passageways for conducting the refrigerant from the float chamber. The portions of folded sheet metal on either side of the float chamber 3 are then shaped to form one or more sharp freezing chambers. In Fig. 1 the laterally extending walls are shown as shaped to provide a single rectangular sharp freezing chamber.

Figure 3:
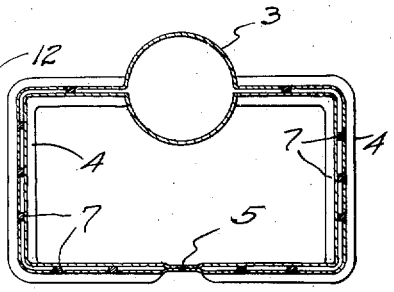
Fig. 3 is a sectional view taken on line 3—3 of Fig. 1, illustrating the manner of forming the unit from one piece of sheet metal.

In this case, the side edges of the folded sheet metal meet at a point 5 and each edge is preferably welded or otherwise sealed as best shown in Fig. 3. The rear edges of each sheet may be also welded or otherwise secured together, and in case the front portion of the unit adjacent the float chamber is cut away, the edges 6 are also welded or otherwise sealed together.

Figure 4:
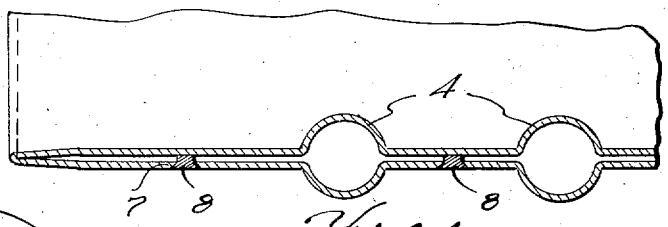
Fig. 4 is a fragmentary sectional view taken on line 4—4 of Fig. 1, and illustrating particularly the manner of securing the sheet metal walls together and also the manner of reinforcing the walls.

Some of the walls formed by the folded halves of sheet metal are preferably formed with a series of apertures 7 and after the sheet metal parts are folded into proper form, the adjacent walls formed by such folding process may be integrally secured together by a welding step wherein the apertures are filled with the welding material and thus positively securing one wall to the other. This is best shown as at 8 in Fig. 4. These apertures are preferably formed in the outer of the two walls forming the unit, but it will be obvious that they may be formed either inside or outside or a combination of the two. It will also be understood that the two walls may be brazed together such as by stamping out suitable portions in the sheet metal wall and positioning a sheet of brazing material between the walls adjacent such stamped out portions. The point here is that the two walls of relatively thin metal are rigidly secured together at spaced points throughout the adjacent surfaces whereby to counteract any expanding action that may be caused by pressure within the unit. It will be understood here that in normal operation very little pressure will be set up in the lowside but that occasionally there might be some danger of the refrigerating system becoming approximately balanced in which case a rather high relative pressure would develop within the cooling unit.

It will be understood that the corrugations 4 may be of any desired shape whereby to enlarge or restrict the passageway for conducting the refrigerant from the float chamber. In practical fabrication of the unit the piece of sheet metal may be folded upon itself so that the two pieces of folded metal will be practically in contact and after the folded sheets of metal have been welded together as explained, the subsequent pressure in the lowside will be sufficient to slightly open up the space between the sheets sufficient to permit a thin film of refrigerant to be retained therebetween. It will thus be obvious that a very thin film of refrigerant will be distributed through every wall of each sharp freezing chamber which will permit of a very quick and efficient freezing with a minimum amount of refrigerant.

Figure 2:
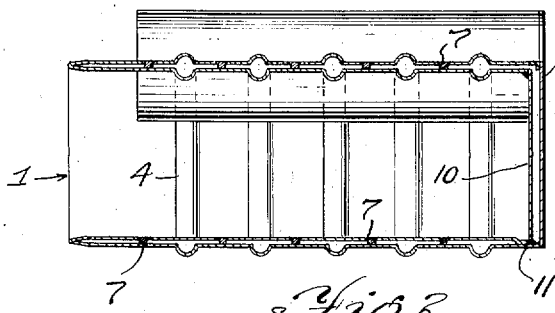
Fig. 2 is a sectional view taken on line 2—2 of Fig. 1, and illustrating the preferred manner of closing in the back of the unit so as to provide a back wall of refrigerant.
Figure 5:
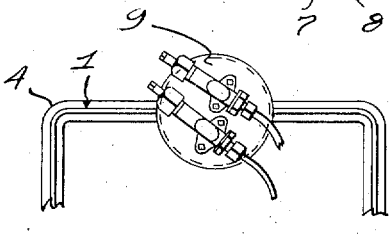
Fig. 5 is a fragmentary front view showing the manner of applying the standard valve header to the float chamber.

The length of the float chamber 3 may be varied as desired, and when once fabricated as to the correct length a suitable header unit with control valves may be welded or otherwise secured thereto as indicated at 9 in Fig. 5. The rear of the unit may, if desired, be provided with a film of liquid the same as the side walls, and as shown in Fig. 2, the inner end walls may be slightly cut away to receive an inner back wall 10 which may be welded thereto as at 11 and the outer end walls of the folded sheet may be provided with a second plate 12 which may be suitably welded to the periphery of the outer folded wall.

In Fig. 6 I have shown a modified method of forming the cooling unit wherein four separate sharp freezing chambers are provided and wherein each chamber is completely surrounded on all four sides by a film of refrigerant. In this case the unit is still formed of one piece of sheet metal but the outer edges 13, 14 and 15 are the only edges which are folded while the other adjacent edges 16 must be welded together at the front, and at the back in case there is no film of refrigerant at the back of the unit.

Fig. 7 is a front view of the structure shown in Fig. 6 and illustrates particularly the method of providing a thin film of refrigerant completely around all four walls of each sharp freezing chamber. In this connection it will be understood that when the ice cube tray is inserted in the sharp freezing chamber that both the sides, top, and bottom will be subjected to a rapid cooling effect.

In Fig. 8 I have illustrated another modified method of fabricating the cooling unit from a single sheet of metal and in Fig. 10 I have diagrammatically illustrated the method of forming a cooling unit wherein both walls of a folded single sheet of sheet metal will be so formed as to provide a continuous passageway as at 17 between the float chamber 18 and a suitable receiver 19.

In Fig. 11 I have shown still another modified form of unit wherein the sharp freezing chambers may be formed by a plurality of separate shells 20 and 21. These shells may be secured to the front of the unit as by welding or may be attached to the outer side walls as previously explained, the main point being that a thin film of refrigerant completely surrounds each sharp freezing chamber.

It will thus be seen that I have provided a cooling unit which represents substantially the minimum possible cost both as to material and method of fabrication. In addition, this cooling unit takes up a relatively small space, requires a very small amount of refrigerant, and so positions the refrigerant in a thin film as to provide a very quick freezing in each individual sharp freezing chamber, while at the same time not affecting the general temperature in the food chambers. In other words, the sharp freezing is localized to the sharp freezing chambers themselves.

What I claim is:

1. A cooling unit of the flooded type comprising a header chamber and a plurality of sharp freezing chambers formed substantially from one sheet of metal, the walls of the header chamber consisting of a single thickness and each wall of the sharp freezing chambers being formed of a double thickness of sheet metal to provide a thin wall of refrigerant on top, bottom, and each side of each sharp freezing chamber.

2. A cooling unit of the flooded type comprising a header chamber and a plurality of sharp freezing chambers formed substantially from one sheet of metal, the walls of the header chamber consisting of a single thickness and each wall of the sharp freezing chambers being formed of a double thickness of sheet metal to provide a thin wall of refrigerant on top, bottom, and each side of each sharp freezing chamber, and reinforcing means in one or more of said walls for reinforcing the same and for assisting in conducting liquid refrigerant from the header chamber to the sharp freezing walls.

3. A cooling unit of the flooded type, comprising a header chamber and one or more sharp freezing chambers formed from a single sheet of metal, the said header chamber being substantially cylindrical in formation and having a longitudinal opening therefrom formed by spaced edges of the walls of the header chamber, the continuation of said sheet metal from the header chamber forming the walls of the sharp freezing chamber or chambers being in communication with said opening, and means for securing the spaced sheet metal forming the walls of the sharp freezing chamber or chambers together at predetermined points adjacent said opening from the header chamber.

4. A sheet metal lowside of the flooded type comprising a header chamber and a plurality of vertically spaced sharp freezing chambers for independently receiving sharp freezing containers, all the walls of the sharp freezing chambers being hollow, the walls of the header chamber being of a single thickness and formed by continuing the same sheet metal used to form the side walls of the sharp freezing chambers, the hollow wall forming the bottom of one of the vertically spaced sharp freezing chambers being in direct communication with the liquid in the header by means of conduits independent of the outer walls of the sharp freezing chambers.

5. A sheet metal cooling unit of the flooded type comprising a substantially cylindrical header chamber and a plurality of sharp freezing chambers, the side walls of the sharp freezing chambers being secured together at spaced points but otherwise being hollow, the metal of the side walls being continued to form the header walls, and a hollow refrigerated shelf separating the sharp freezing chambers and being in direct communication with the liquid in the header, independently of the outer walls of the sharp freezing chambers.

6. A sheet metal evaporator formed from a single sheet of metal comprising an outer one-piece shell having a centrally positioned substantially half cylindrical portion and laterally extending side walls bent to form a sharp freezing chamber or chambers, an inner one-piece shell having an oppositely formed substantially half cylindrical portion and laterally extending walls cooperating with the side walls of the outer shell, said two arcuate portions registering complementally to form a substantially cylindrical header, the side walls being secured together at their ends and at a plurality of welded points intermediate the ends, said welded points being such as to permit a thin film of refrigerant between the cooperating walls, said refrigerant being allowed to circulate in any direction within the walls, one of the laterally extending walls being embossed to reinforce the walls of the sharp freezing chamber or chambers adjacent the header.

7. A sheet metal evaporator comprising an outer one-piece shell having a centrally positioned substantially half cylindrical portion and laterally extending side walls bent to form a sharp freezing chamber or chambers, an inner one-piece shell having an oppositely formed substantially half cylindrical portion and laterally extending walls cooperating with the side walls of the outer shell, said two arcuate portions registering complementally to form a cylindrical header, the side walls being secured together at their ends and at a plurality of welded points intermediate the ends, said welded points being such as to permit a thin film of refrigerant between the cooperating walls, said refrigerant being allowed to circulate in any direction within the walls, one of the laterally extending walls being embossed to reinforce the walls of the sharp freezing chamber or chambers adjacent the header, said reinforcing embossed portions providing enlarged openings for receiving liquid refrigerant from the header.

8. A sheet metal evaporator formed from a single sheet of metal comprising a cylindrical header, said header being formed of two half cylindrical portions contacting at their edges, walls of double thickness shaped to provide a sharp freezing chamber or chambers, certain side walls of the sharp freezing chamber or chambers being continued to form the half cylindrical portions of the header, said side walls being sufficiently spaced apart and in direct communication with the liquid in the header to maintain a thin film of refrigerant in all of said walls of double thickness, said side walls being secured together at their ends and welded together at points intermediate the ends, said thin film of refrigerant being continuous except for said welded points.

9. A sheet metal evaporator comprising a substantially cylindrical header, said header being formed of two substantially half cylindrical portions contacting at their edges, walls of double thickness shaped to provide a sharp freezing chamber or chambers, certain side walls of the sharp freezing chamber or chambers being continued to form the substantially half cylindrical portions of the header, said side walls being sufficiently spaced apart and in direct communication with the liquid in the header to maintain a thin film of refrigerant in all of said walls of double thickness, said side walls being secured together at their ends and welded together at points intermediate the ends, said thin film of refrigerant being continuous except for said welded points, and a plurality of embossed portions in said walls of double thickness which are closely adjacent the substantially cylindrical header for reinforcing the walls of the evaporator at the points where they merge into the walls of the header.

10. A sheet metal evaporator comprising a substantially cylindrical header, said header being formed of two substantially half cylindrical portions contacting at their edges, walls of double thickness shaped to provide a sharp freezing chamber or chambers, certain side walls of the sharp freezing chamber or chambers being continued to form the substantially half cylindrical portions of the header, said side walls being sufficiently spaced apart and in direct communication with the liquid in the header to maintain a thin film of refrigerant in all of said walls of double thickness, said side walls being secured together at their ends and welded together at points intermediate the ends, said thin film of refrigerant being continuous except for said welded points, and a plurality of embossed portions in said walls of double thickness which are closely adjacent the substantially cylindrical header for reinforcing the walls of the evaporator at the points where they merge into the walls of the header, said embossed portions being positioned around the walls of the sharp freezing chamber or chambers to form large passageways for the refrigerant, in addition to their reinforcing action.

11. A sheet metal evaporator comprising a header formed of two substantially contacting substantially half cylindrical portions, the walls of said oppositely positioned substantially half cylindrical portions being bent to extend laterally, downwardly and inwardly to form at least three walls of a sharp freezing chamber or chambers, the walls of the sharp freezing chamber or chambers being of double thickness and being secured together and reinforced at points extending parallel to and closely adjacent the header and also closely adjacent the line of substantial contact between the header halves, an edge of some of the double walls being formed by folding a single sheet of metal.

12. A sheet metal evaporator of the flooded type having a header chamber and laterally extending walls forming a sharp freezing chamber or chambers, comprising an outer one-piece shell having an arcuate portion forming the greater part of said header and laterally extending walls bent to form one or more sharp freezing chambers, an inner one-piece shell cooperating with the laterally extending walls and arcuate portion of the outer shell to form one or more sharp freezing chambers, the outer shell being provided with embossed portions extending transversely from the header to form passageways for the refrigerant and to permit welding together of the shells, and reinforcing embossed portions formed in said inner shell and positioned opposite the arcuate portion formed by the outer shell.

13. A sheet metal evaporator of the flooded type having a header chamber and laterally extending walls forming a sharp freezing chamber or chambers, comprising a one-piece shell having an arcuate portion forming the greater part of said header and a laterally extending wall bent to define a portion of one or more sharp freezing chambers, a second one-piece shell cooperating with the laterally extending wall and arcuate portion of the first named shell to form one or more sharp freezing chambers, one of said shells being provided with embossed portions extending transversely from the header to form passageways around the chamber or chambers for the refrigerant and to permit welding together of the shells, and reinforcing embossed portions formed in said second shell and positioned directly adjacent the opening and extending transversely of the axis of the arcuate portion formed by said first named shell.

14. A sheet metal evaporator comprising an outer one-piece shell and an inner one-piece shell, said shells being provided with oppositely positioned portions to form a header, walls formed by each shell extending laterally from the header portion thereof, said walls cooperating to form top and side walls of a sharp freezing chamber, the outer shell being provided with corrugations extending laterally from said header portion to form passageways and to permit welding of the shells together, the top wall of the inner shell being provided with reinforcing embossed portions extending transversely of the axis of the header.

15. A sheet metal evaporator of the flooded type having a header chamber and laterally extending walls forming a sharp freezing chamber or chambers, comprising a one-piece shell having an arcuate portion forming the greater part of said header and a laterally extending wall bent to define a portion of one or more sharp freezing chambers, a second one-piece shell cooperating with the laterally extending wall and arcuate portion of the first shell to form one or more sharp freezing chambers, one of said shells being provided with embossed portions extending transversely from the header to form passageways for the refrigerant and to permit welding together of the shells, and reinforcing embossed portions formed in said second shell and positioned directly adjacent and opposite the arcuate portion formed by said first named shell.

16. A sheet metal evaporator comprising a header formed of two substantially contacting substantially half cylindrical portions, the walls of said oppositely positioned substantially half cylindrical portions being bent to extend laterally, downwardly and inwardly to form top, side and bottom portions of a sharp freezing chamber or chambers, the walls of the sharp freezing chamber or chambers being of double thickness and being secured together and reinforced at points extending parallel to and closely adjacent the header and also closely adjacent the line of substantial contact between the header halves, the front edge of some of the double walls being formed by folding a single sheet of metal.

17. A sheet metal evaporator of the flooded type having a header chamber and laterally extending walls forming a sharp freezing chamber or chambers, comprising an outer one-piece shell having an arcuate portion forming the greater part of said header and laterally extending walls bent to form one or more sharp freezing chambers, an inner one-piece shell cooperating with the laterally extending walls and arcuate portion of the outer shell to form one or more sharp freezing chambers, the outer shell being provided with embossed portions extending transversely from the header to form passageways for the refrigerant and to permit welding together of the shells, and reinforcing embossed portions formed in said inner shell and positioned opposite and extending transversely of the axis of the arcuate header formed by the outer shell.

18. A sheet metal evaporator comprising an outer one piece shell and an inner one piece shell, both formed from a single sheet of metal, said sheet of metal being folded upon itself on substantially a center transverse line to form said shells, certain portions of the folded walls of said sheet being prefabricated and cooperating to form a refrigerant chamber extending transversely of the line of fold of said single sheet, said shells extending transversely, embossed portions formed in at least one of said shells and said shells being welded together in between said embossed portions and being folded to define one or more sharp freezing chambers, said embossed portions forming enlarged passageways for conducting refrigerant around the walls of said sharp freezing chamber or chambers, the edge of the shells opposite the folded over edge being welded together, the portions of the single sheet folded over to form an edge of said sharp freezing chamber or chambers being spaced apart adjacent said folded over edge to receive refrigerant therein.

MORRIS F. BOOTH.